(12) United States Patent
McHugh

(10) Patent No.: US 6,681,802 B2
(45) Date of Patent: Jan. 27, 2004

(54) IN-LINE VALVE ARRANGEMENT FOR FIRE SUPPRESSION WATER SPRINKLER SYSTEM

(75) Inventor: George J. McHugh, Broomall, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 0 days.

(21) Appl. No.: 10/273,989

(22) Filed: Oct. 21, 2002

(65) Prior Publication Data

US 2003/0084942 A1 May 8, 2003

Related U.S. Application Data

(60) Provisional application No. 60/330,087, filed on Oct. 19, 2001.

(51) Int. Cl.$^7$ ................................................. F16K 3/22
(52) U.S. Cl. ......................... 137/613; 137/559; 73/168
(58) Field of Search ....................... 137/613, 559; 73/168

(56) References Cited

U.S. PATENT DOCUMENTS

| | | |
|---|---|---|
| 4,655,078 A | 4/1987 | Johnson |
| 4,741,361 A | 5/1988 | McHugh |
| 4,852,610 A | 8/1989 | McHugh |
| 4,971,109 A | 11/1990 | McHugh |
| 4,993,453 A | 2/1991 | McHugh |
| 4,995,423 A | 2/1991 | McHugh |
| 5,103,862 A | 4/1992 | McHugh |
| 6,196,262 B1 * | 3/2001 | Giacomini .................. 137/559 |

* cited by examiner

*Primary Examiner*—Kevin Lee
(74) *Attorney, Agent, or Firm*—Burns, Doane, Swecker & Mathis, LLP

(57) ABSTRACT

A valve arrangement for use in a fire suppression sprinkler system includes a valve member for controlling the flow of a fluid. The valve member has a housing having an inlet and an outlet. The valve member defines a first configuration selectively permitting an unrestricted flow from the inlet to the outlet, and a second configuration selectively permitting a restricted flow from the inlet to the outlet. The valve member includes a first ball member and a second ball member disposed within the housing.

39 Claims, 11 Drawing Sheets

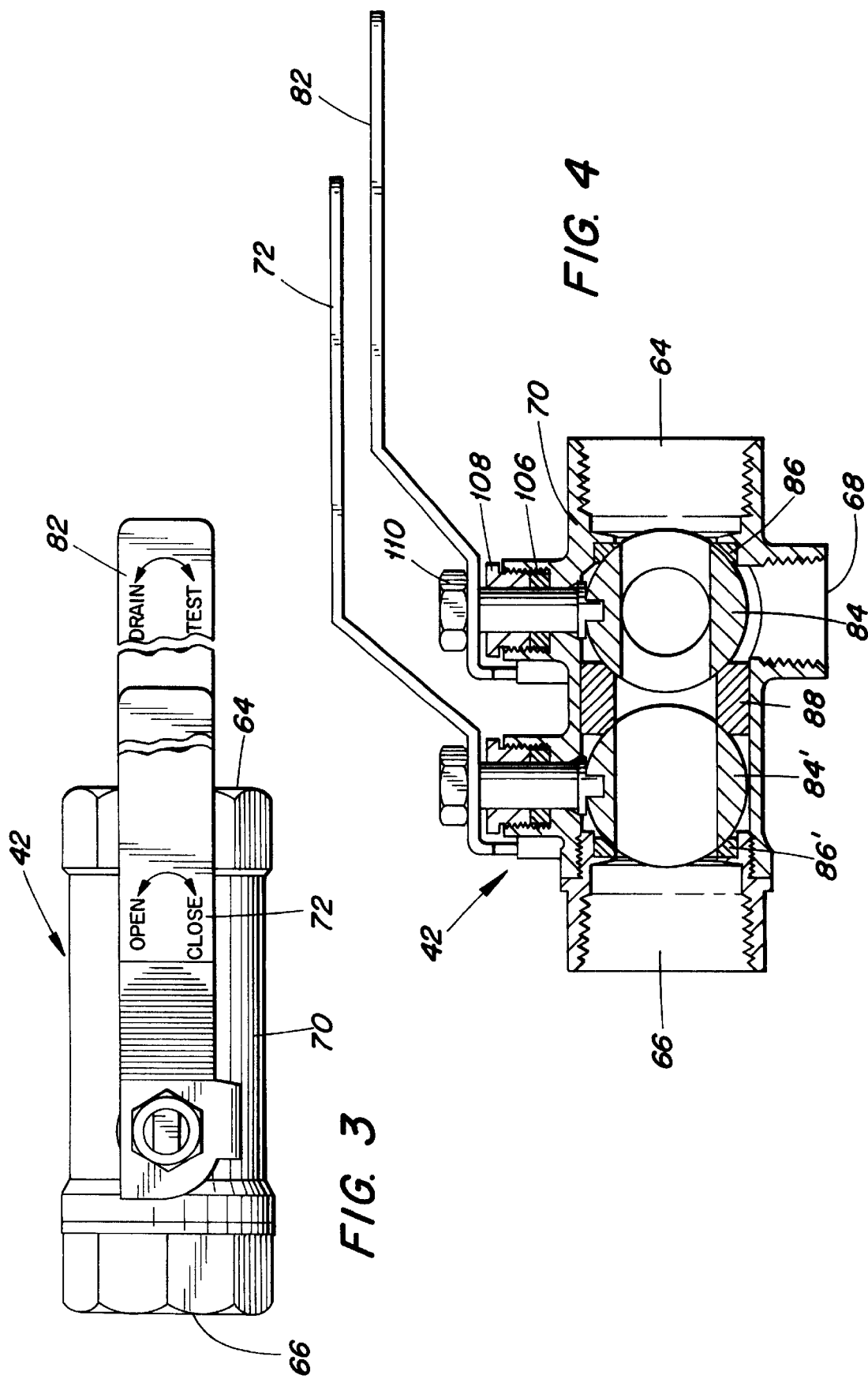

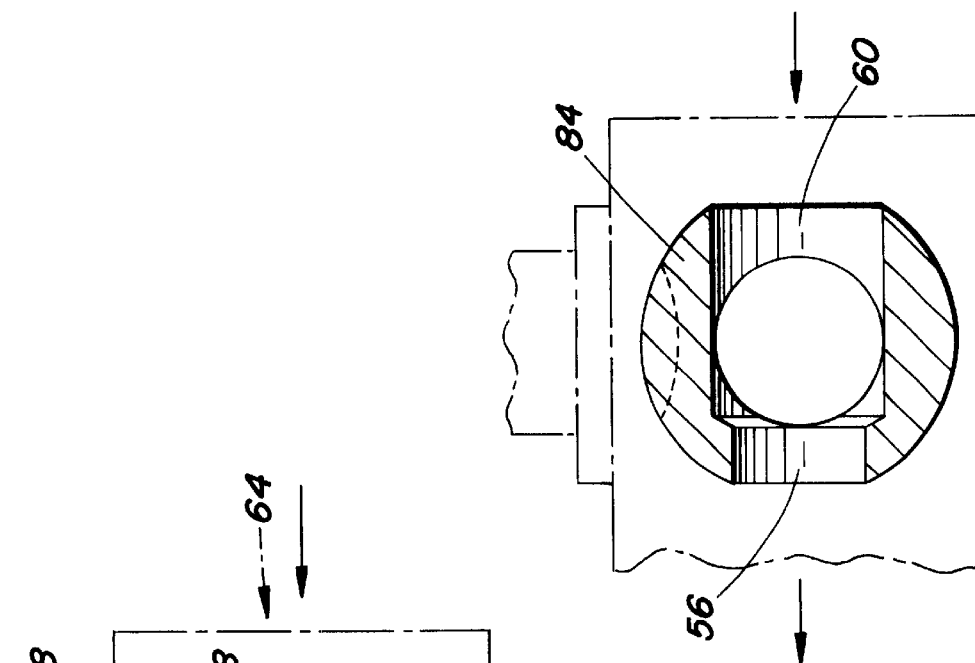
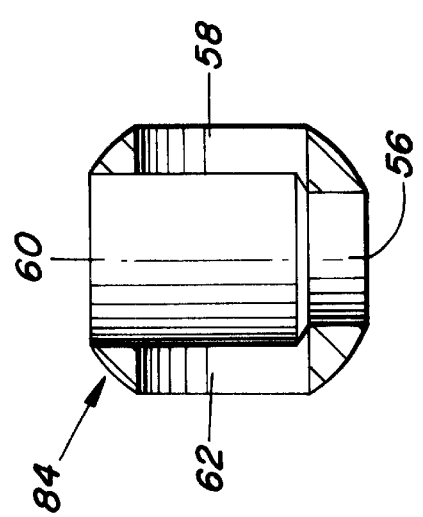
FIG. 5A  FIG. 5B  FIG. 5C

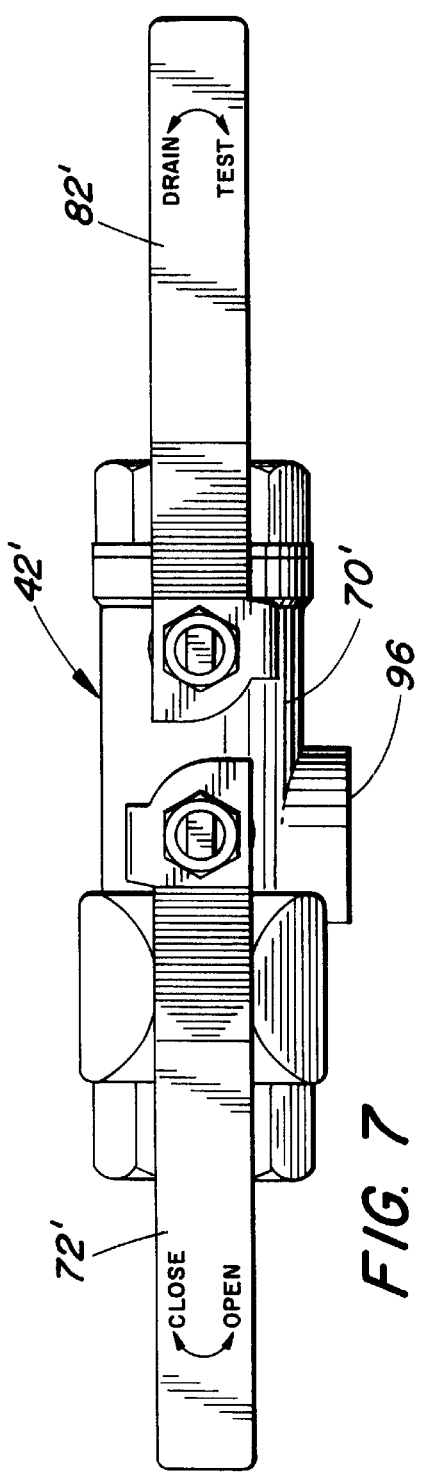
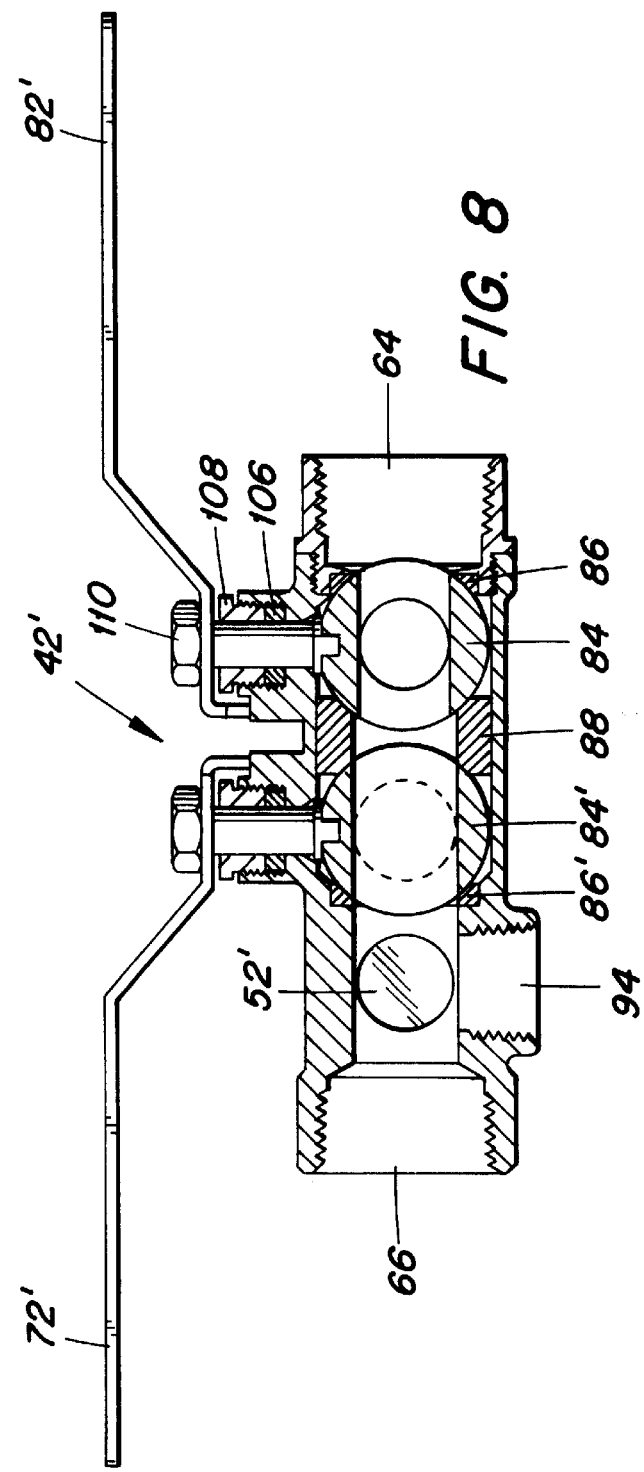

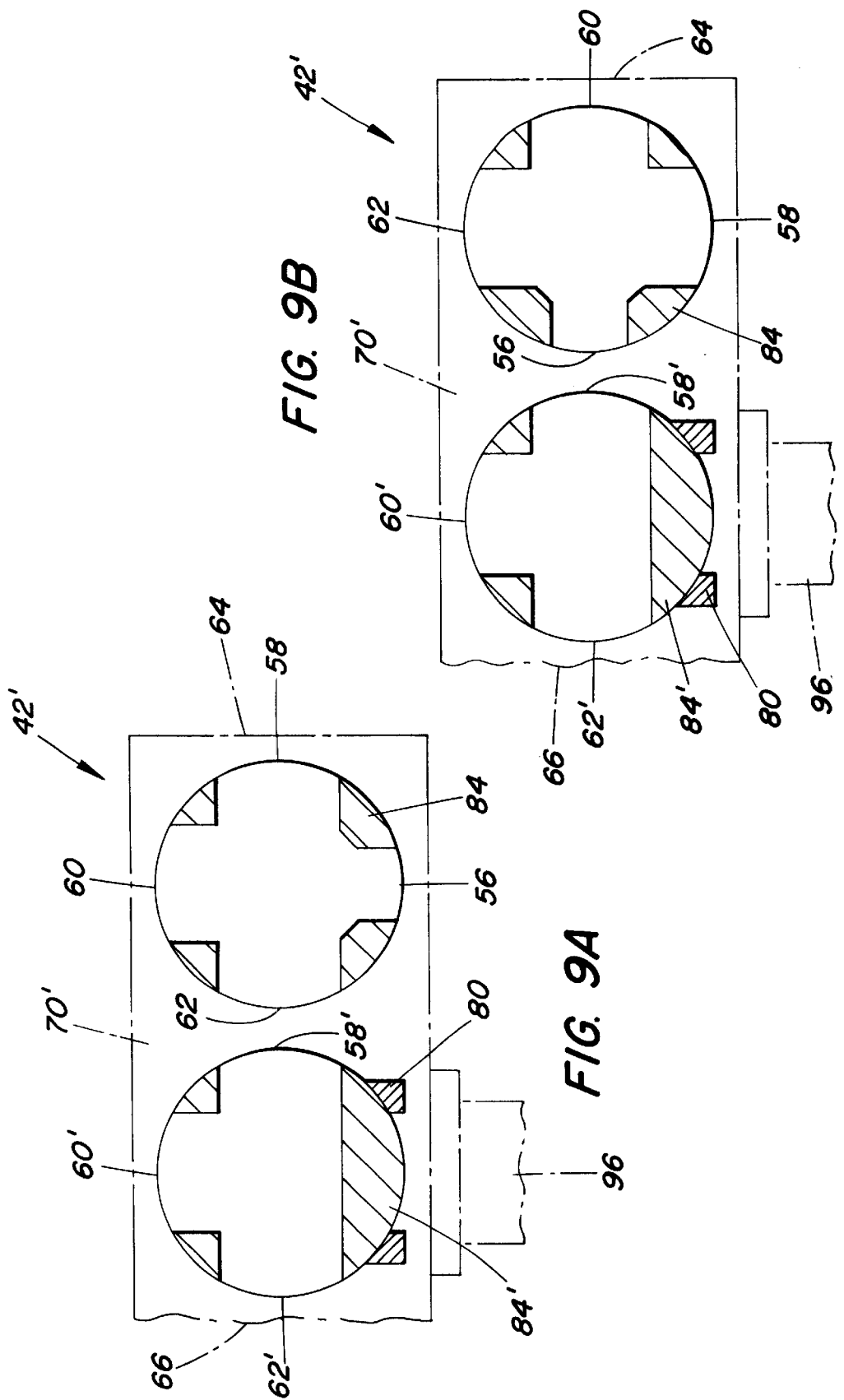

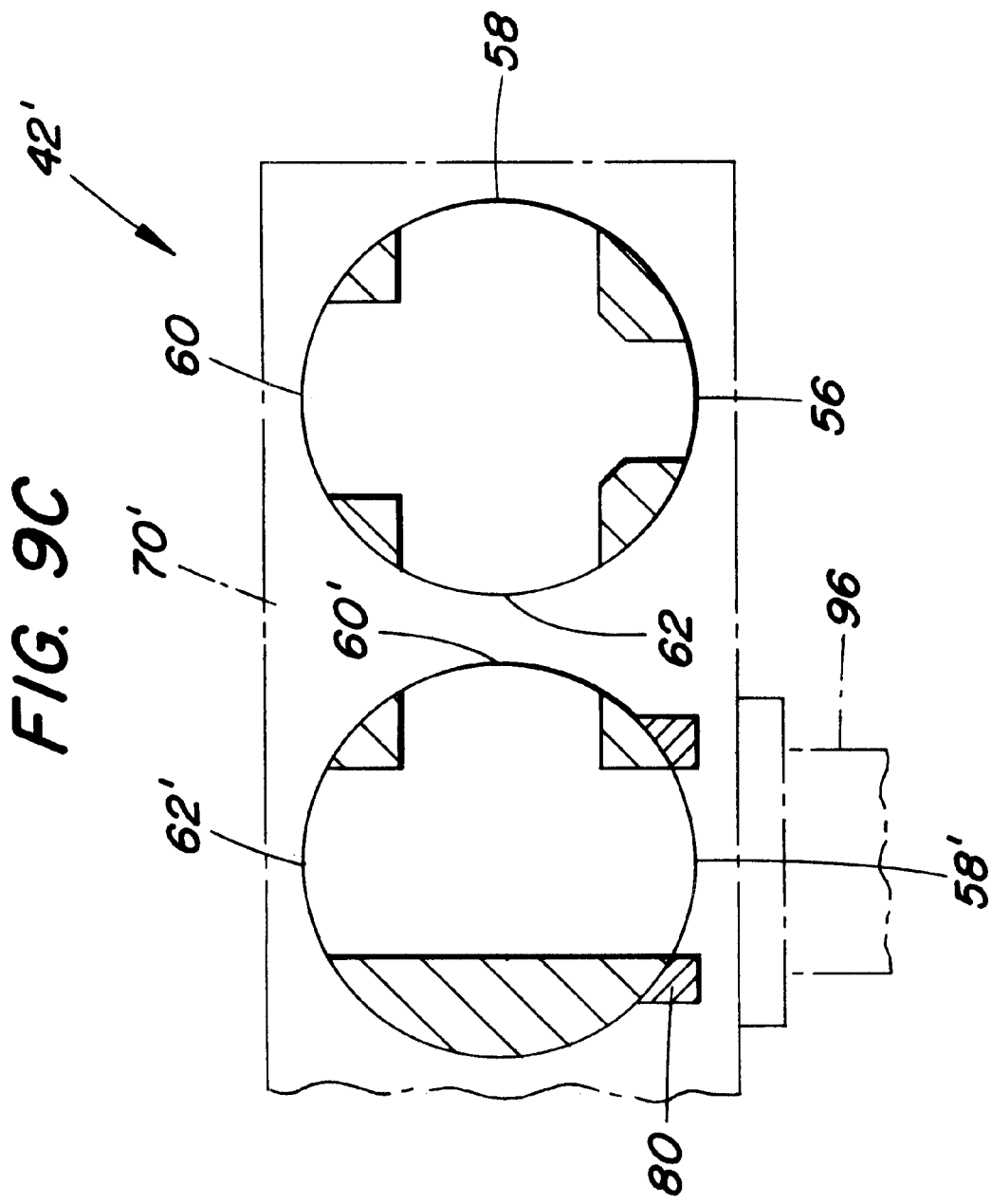

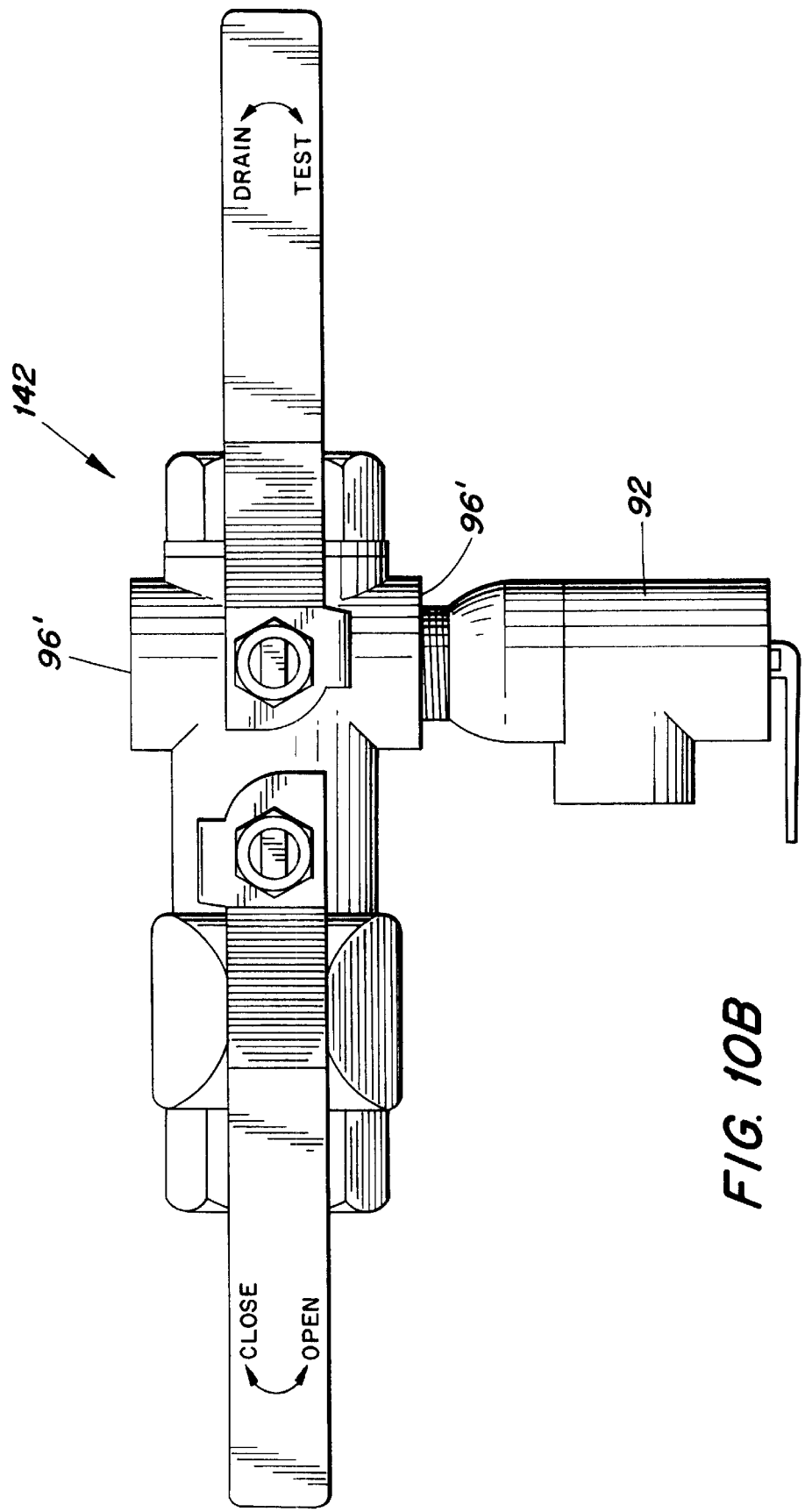

IN-LINE VALVE ARRANGEMENT FOR FIRE SUPPRESSION WATER SPRINKLER SYSTEM

This application claims priority under 35 U.S.C. §119 to U.S. Provisional Application No. 60/330,087 entitled IN-LINE VALVE ARRANGEMENT FOR FIRE SUPPRESSION WATER SPRINKLER SYSTEM and filed on Oct. 19, 2001, the entire content of which is hereby incorporated by reference.

The present invention relates generally to valves, and more particularly, to in-line valve arrangements for use in testing and draining fire suppression water sprinkler systems.

BACKGROUND OF THE PRESENT INVENTION

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes the drainage valve). It is, of course, possible to alternatively place a sight glass upstream of the testing valve. Since it may be desirable to determine the pressure of the water upstream of the testing valve, prior to and during a test operation, it is also conventional to provide a fitting or port to receive a pressure gauge upstream of the testing valve.

The use of separate drainage valves and testing valves results in significant time and expense during the installation of such plumbing. Accordingly, various valves and arrangements for testing are combined with the capability of draining fire suppression systems, such as shown and described in U.S. Pat. Nos. 5,103,862, 4,971,109, 4,995,423, 4,852,610, 4,741,361, all of which are assigned to AGF Manufacturing, Inc. and incorporated herein by reference.

In fire protection systems, it is sometimes desirable or necessary (and may be required by local ordinance) to provide a pressure relief mechanism in the fire sprinkler system in communication with the arrangement of piping that supplies water (or some other fluid) to the individual sprinkler heads. In order to provide a pressure relief feature for a fire sprinkler system, it is known to provide a Tee fitting in the piping arrangement in communication with the sprinkler heads and to connect an inlet of a suitable, conventional pressure relief valve with the arrangement of piping through one of the openings in the Tee fitting. The outlet of the pressure relief valve is then directed as desired, either to a drain or outside of the structure being protected by the fire sprinkler system.

It is also known to arrange the pressure relief valve in connection with an inspector's test valve. However, the known arrangements have not reliably and economically provided for a straight line flow through a valve having both testing and pressure relief capabilities.

SUMMARY OF THE INVENTION

The present invention overcomes the limitations associated with the prior art by providing an economical and reliable in-line valve arrangement for use in a fire suppression sprinkler system. The valve arrangement comprises a valve member for controlling the flow of a fluid, said valve member comprising a housing having an inlet and an outlet, said valve member comprising a first configuration selectively permitting an unrestricted flow from the inlet to the outlet, and a second configuration selectively permitting a restricted flow from the inlet to the outlet. The valve member includes a first ball member and a second ball member disposed within said housing. In a preferred embodiment, the first ball member includes first, second, third and fourth ports arranged about a surface of said first ball member while the second ball member includes at least first and second ports arranged about a surface of said second ball member. One of said ports on said first ball member defines a restricted opening which is smaller than the remaining ports on the first ball member.

BRIEF DESCRIPTION OF THE DRAWINGS

Preferred embodiments of the present invention will be described in greater detail with reference to the accompanying drawings, wherein like members bear like reference numerals and wherein:

FIG. 3 is a top view of the valve of the arrangement of FIG. 1.

FIG. 4 is a cross-sectional view of the valve of FIG. 3.

FIG. 5A is a side cross-sectional view of the first ball member of the valve in a drain position according to the present invention.

FIG. 5B is a top cross-sectional view of the first ball member of the valve in the drain position shown in FIG. 5A.

FIG. 5C is a side cross-sectional view of the first ball member of the valve in a test position according to the present invention.

FIG. 7 is a top view of an alternative embodiment of the valve according to the present invention.

FIG. 8 is a cross-sectional view of the valve of FIG. 7.

FIG. 9A is a top cross-sectional view of the valve of FIG. 7 in a drain configuration according to the present invention.

FIG. 9B is a top cross-sectional view of the valve of FIG. 7 in a test configuration according to the present invention.

FIG. 9C is a top cross-sectional view of the valve of FIG. 7 in a closed configuration according to the present invention.

FIGS. 10A–10C illustrate top views of further alternative embodiments of the valve according to the present invention.

DETAILED DESCRIPTION OF THE PRESENT INVENTION

Figure 1:
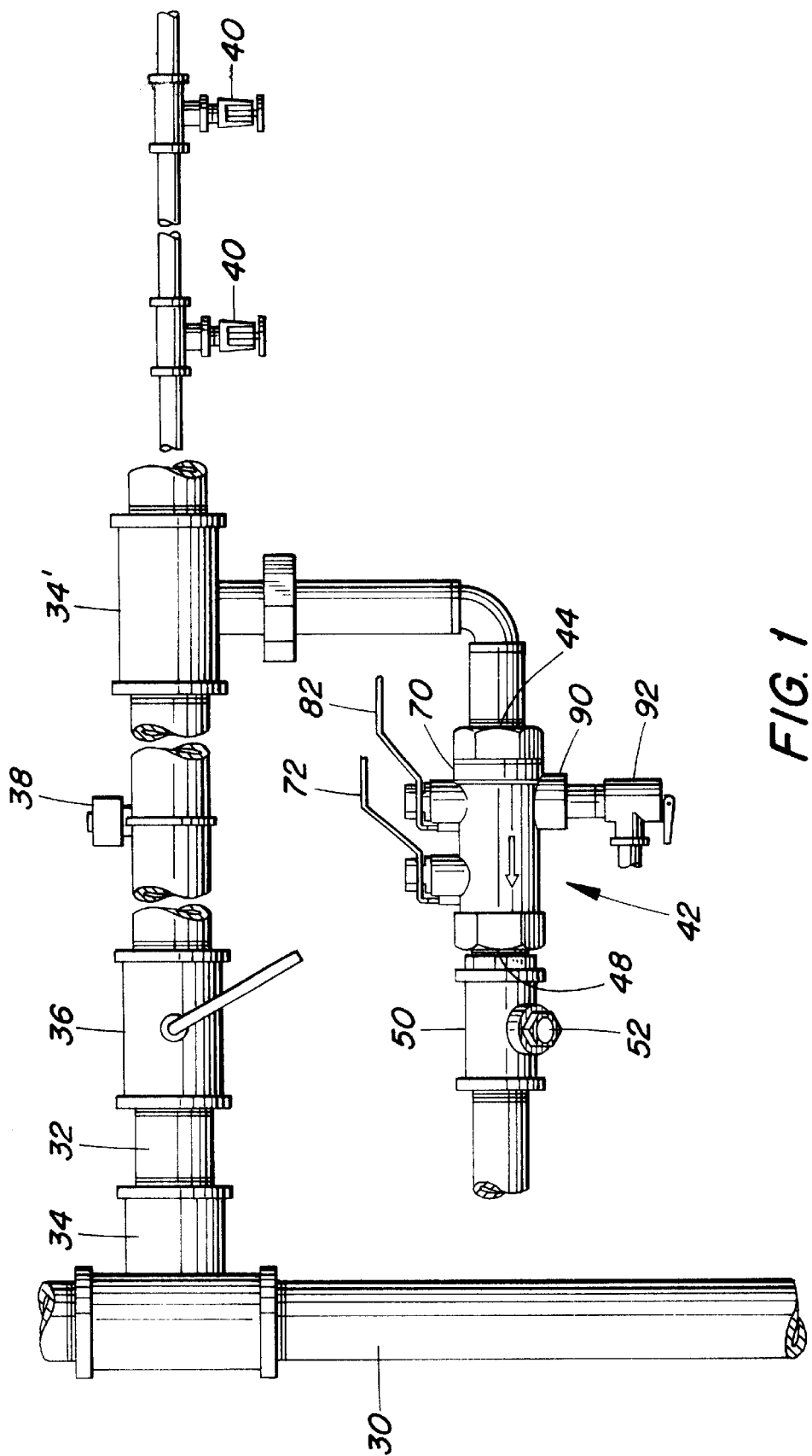
FIG. 1 is a side view of an arrangement for testing and draining a fire suppression water sprinkler system according to the present invention.

With reference to FIG. 1, an arrangement for testing and draining a fire suppression water sprinkler system includes a main conduit 30 for supplying water. The conduit 30 supplies a branch conduit 32 by way of a Tee fitting 34. A main valve 36 is provided for the branch conduit 32 with the main valve 36 operable to permit or to interrupt the flow of water through the branch conduit 32.

Downstream of the main valve 36 is provided a water flow switch 38 and a plurality of individual sprinkler heads 40. The water flow switch 38 is of suitable conventional design and typically includes a paddle or other member (not shown) which extends into the branch conduit 32. The paddle is connected to a switch which is closed when the flow of water through the branch conduit is sufficient to move the paddle a predetermined amount. Closure of the switch provides an electrical signal which may be used to trigger a fire alarm or to alert a fire department. Preferably, the flow switch 38 is configured to detect a flow through the conduit 32 corresponding at least to the flow through a single sprinkler head 40.

As is conventional in the art, the individual fire sprinklers 40 are provided with a member that melts when the ambient temperature reaches a predetermined level indicative of a fire. Upon melting, the member opens the fire sprinkler to spray water to suppress the fire. When it is desired to replace one or more of the individual water sprinklers, the valve 36 is closed and then the water sprinkler system is preferably drained, so that the removal of one or more of the individual water sprinklers will not result in a flow of water through the fitting for the water sprinkler.

A valve 42 according to the present invention is connected to the branch conduit 32 through a further Tee fitting 34', disposed downstream from the main valve 36 and prior to the individual sprinkler heads 40. The valve 42 has an inlet 44 and an outlet 48 which are threadingly connected through an arrangement of pipes and elbows. Other arrangements for connecting the valve 42 to the branch conduit 32 will be readily apparent to one skilled in the art.

Figure 2:
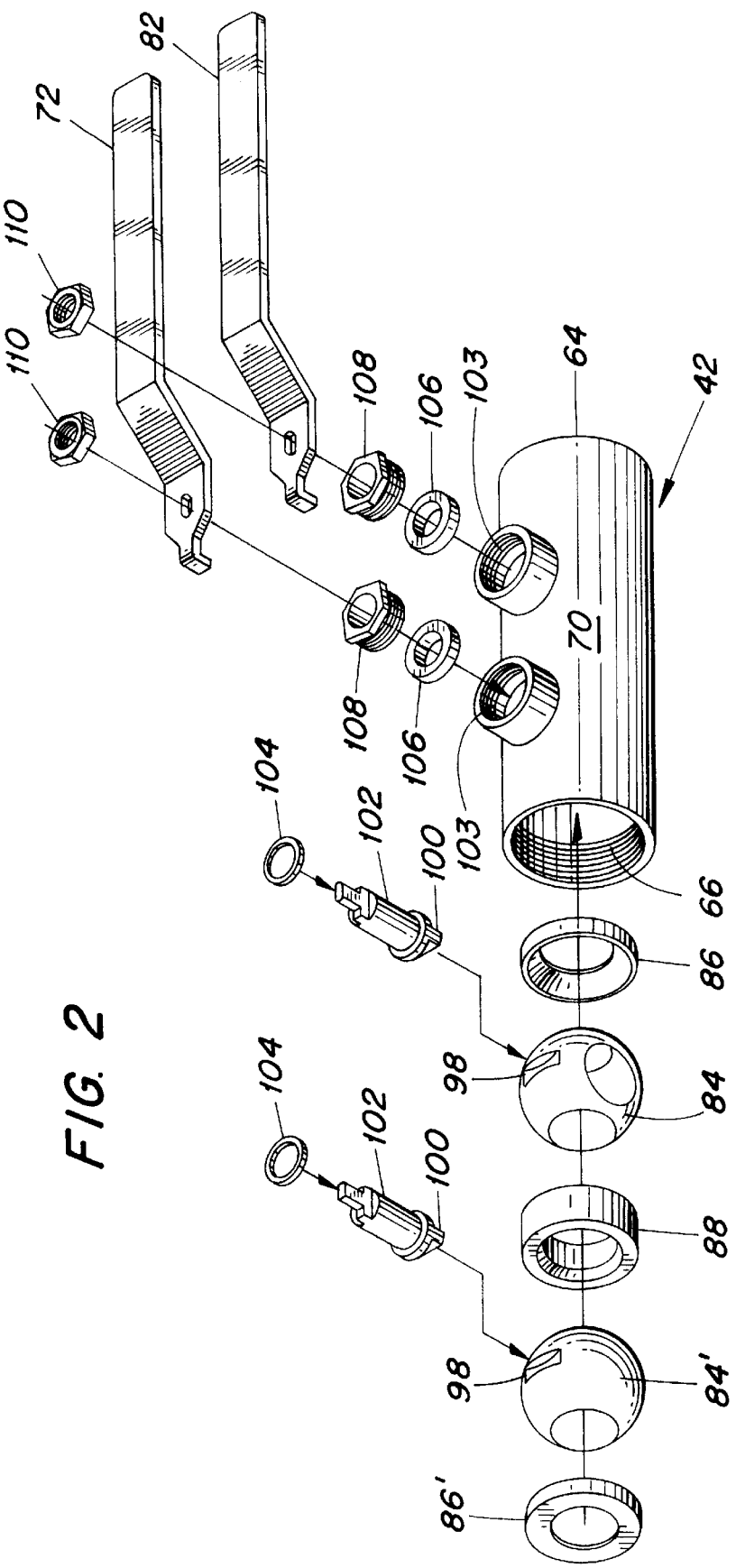
FIG. 2 is an exploded pictorial view of a valve according to the present invention.

With reference now to FIGS. 2–4, a valve 42 according to the present invention includes a housing 70 having at least two and preferably three threaded openings 64, 66 and 68, two of which are coplanar and spaced apart by 180 degrees. When in use as in the arrangement of FIG. 1, the second opening 66 is the outlet of the housing 70 and the first opening 64 is the inlet. The third opening 68 (see FIG. 4) is optional and has a threaded boss which forms a tapping for pressure relief of the system or for receiving a solenoid, as described in greater detail below.

Two control levers 72, 82 are mounted on the valve housing 70 as by a pair of nuts 110. In the illustrated embodiment, the control lever 72 is permitted to travel between "open" and "close" positions and the control lever 82 is permitted to travel between "drain" and "test" positions, however, other designations could of course also be used.

The valve 42 includes a first ball member 84 and a second ball member 84' which are received within an interior chamber of the housing 70 of the valve 42. The ball member 84 is carried by an annular seat 86 against the inlet opening 64 and the ball member 84' is carried by an annular seat 86' against the outlet opening 66. A further annular seat 88 is disposed between the first ball member 84 and the second ball member 84'. The seats 86, 86', 88 thereby conform to the spherical shape of the ball members 84, 84'.

Each of the ball members 84, 84' is provided with a slot 98 which is adapted to receive a lowermost tab 100 of a stem 102. The stem is inserted into the valve housing 70 through a threaded opening 103 which is perpendicular to the openings 64, 66. The stem may be provided with an annular bearing 104, a packing 106, and a threaded nut 108 to maintain the stem in secure engagement with the slot of the ball member 84, 84'. The control levers 72, 82 are then mounted on the respective stem 102 by a nut 110. The control levers 72, 82 each have a depending tab which selectively limits movement of the control lever. In this way, movement of the ball members 84, 84' is likewise limited to movement between the "test" and "drain" or "open" and "close" positions, respectively.

Referring now to FIG. 5A, the control lever 82 is movable between a first "drain" position in which fluid communication between the inlet 64 and the outlet 66 is allowed at an unrestricted flow (assuming that ball member 84' is in the "open" position). The first ball member 84 has four coplanar openings or ports 56, 58, 60, and 62 (see FIG. 5B) provided about a periphery of the ball member in communication with one another. The first opening or port 56 has a cross-sectional opening which permits a flow corresponding to the flow through a single sprinkler head 40 of the fire suppression system. The rate of flow for a given fluid at a given pressure is commonly designated as "k" or the "k factor" and so the "k factor" of the passageway through the restricted opening 56 is preselected or adjusted so as to correspond to the "k factor" through a single sprinkler head 40 in the fire suppression system to be tested. The second, third and fourth openings or ports 58, 60, 62 have a cross-sectional opening corresponding to the unrestricted flow through the inlet and outlets of the valve. For convenience of discussion with reference to the figures, ports 56 and 60 are oppositely disposed and ports 58 and 62 are oppositely disposed. Thus, as shown in FIG. 5A, when control lever 82 is in the "drain" position, an unrestricted flow is obtained through ports 58 and 62.

The control lever 82 may be moved clockwise from the "drain" position to the "test" position with the first ball member 84 likewise being rotated 90 degrees within the valve housing 70. As shown in FIG. 5C, when the control lever 82 is in the "test" position, fluid communication is provided between the inlet 64 and the outlet 66 of the valve housing 70 through the port 60 and the restricted opening 56 provided in the first ball member 84. When the control lever 82 is in the "test" position, and the second ball member 84' is in an "open" position, the flow through the valve 42 from the inlet 44 to the outlet 48 in a preferred embodiment corresponds to the flow through a single fire sprinkler head 40 of the system to be tested.

Figure 6A:
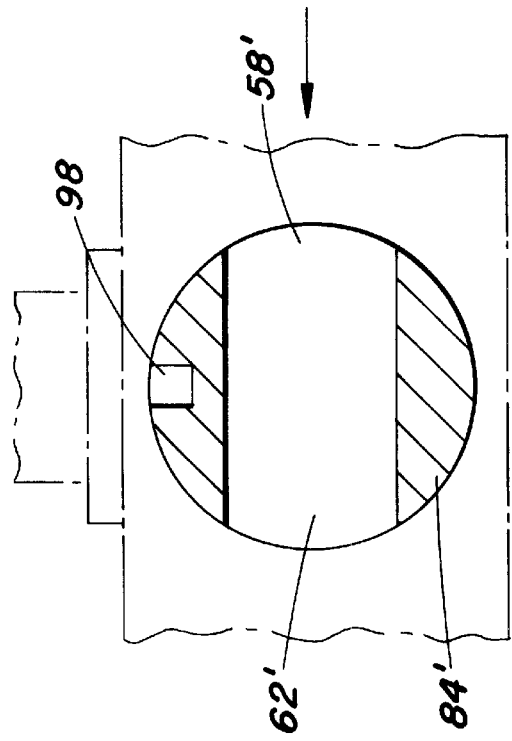
FIG. 6A is a side cross-sectional view of the second ball member of the valve in an open position according to the present invention.

Similarly, the control lever 72 is movable between a first "open" position in which fluid communication between the inlet 64 and the outlet 66 is allowed at an unrestricted flow, as shown in FIG. 6A, assuming the first ball member 84 is in a "drain" position. The second ball member 84' has at least two openings 58', 62', and more preferably three coplanar openings or ports 58', 60', and 62' (see FIG. 6B) provided about a periphery of the ball member in communication with one another. The first opening or port 58' as well as the second and third openings or ports 60', 62' each have a cross-sectional opening corresponding to the unrestricted flow through the inlet and outlets of the valve. Thus, in the "open" position, an unrestricted flow is obtained through ports 58' and 62'. The purpose of the third port 60', if provided on the second ball member 84', will be described below in greater detail.

Figure 6C:
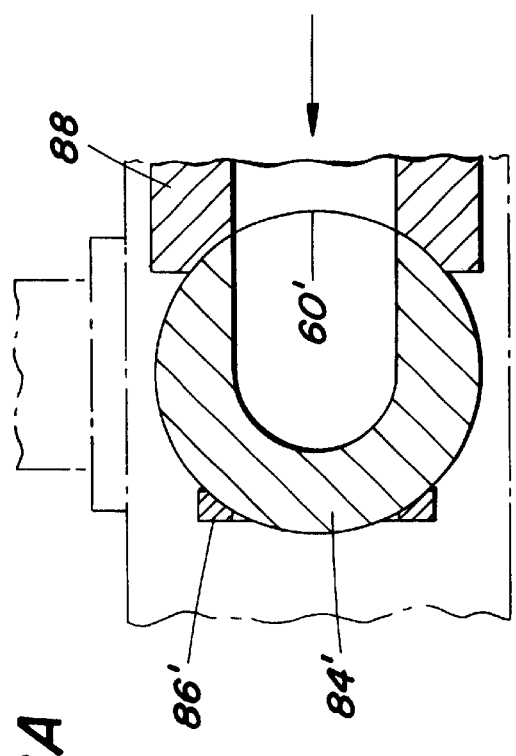
FIG. 6C is a side cross-sectional view of the second ball member of the valve in a closed position according to the present invention.
Figure 6B:
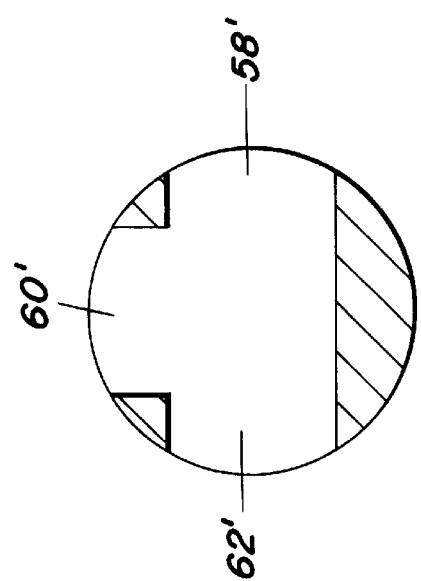
FIG. 6B is a top cross-sectional view of the second ball member of the valve in the open position shown in FIG. 6A.

Referring to FIG. 6C, when the control lever 72 is in the "close" position, fluid communication is prevented by a solid portion of the ball member 84' meeting the seat 86' provided within the valve housing. The valve housing includes the annular valve seat 86' provided within the outlet of the valve adjacent to the ball member 84' so that when a solid portion of the ball member 84' is adjacent the valve seat 86' (when the control lever 82 is in the "close" position) flow through the valve to the outlet is blocked.

Thus, the control lever 72 may be moved clockwise from the "open" position to the "close" position with the ball member 84' likewise being rotated 90 degrees within the valve housing. In the "open" configuration, and assuming the first ball member 84 is in a "drain" position, flow through the valve 42 from the inlet 44 to the outlet 48 passes from the port 58' through the port 62' to permit a flow corresponding to an unrestricted flow. When the control lever 72 is in the "close" position, flow through the valve 42 from the inlet 44 enters into the port 60', if a third port is provided, but the outlet 48 is blocked by the solid portion of the second ball member 84'.

With reference to FIG. 1, the valve 42 may optionally be provided with a boss 90 for tapping to provide a solenoid or a pressure relief function for the fire suppression system by providing a pressure relief valve 92. As illustrated, the boss 90 is associated with the first ball member 84. The outlet of the pressure relief valve may be piped to a drain as desired. During installation of a fire suppression system, the system is usually initially tested at a higher pressure than that which can be withstood by a pressure relief valve. Thus, the boss 90 should initially be provided with a plug (not shown) in order to test the initial installation. Thereafter, the system can be shut off and drained so that removal of the plug from the tapping 90 is permitted. That is, referring to FIG. 5B, since it is not possible to shut off the flow to the tapping 90 provided on the first ball member 84, the system should be drained. Thereafter, a pressure relief valve 92 can then be installed in the tapping 90 and normal operation may resume. In this way, the valve 42 provides a test configuration as well as a pressure relief function for the fire suppression system in a relatively simple and inexpensive manner. If a solenoid or pressure relief function is not desired, a plug (not shown) may remain inserted in the tapping boss 90 so as not to otherwise interfere with normal operation of the valve.

An alternative and most preferred embodiment of the present invention is shown in FIGS. 7 and 8 generally by valve 42', wherein like reference numerals have been used to represent like components. The valve 42' according to the present invention includes a housing 70' having at least two and preferably three or four threaded openings 64 and 66 and 96 and 94, openings 64 and 66 of which are coplanar and spaced apart by 180 degrees. When disposed in use as in the arrangement of FIG. 1, the second opening 66 is the outlet of the housing 70' and the first opening 64 is the inlet. If the third and fourth openings are provided, the third opening 96 forms a pressure relieve tapping for the system and the fourth opening 94 forms a return passage from the pressure relief valve (not shown), as described in greater detail below.

Two control levers 72', 82' are mounted on the valve housing 70' as by a pair of nuts 110. In the illustrated embodiment, the control lever 72' is permitted to travel between "open" and "close" positions and the control lever 82' is permitted to travel between "drain" and "test" positions, however, other designations could of course also be used.

The valve 42' includes a first ball member 84 and a second ball member 84' which are received within an interior chamber of the housing 70' of the valve 42'. The ball member 84 is carried by an annular seat 86 against the inlet opening 64 and the ball member 84' is carried by an annular seat 86' against the outlet opening 66. A further annular seat 88 is disposed between the first ball member 84 and the second ball member 84'. The seats 86, 86', 88 thereby conform to the spherical shape of the ball members 84, 84'. Still further, an annular seat 80 (see FIG. 9A) may be disposed between the ball member 84' and the opening 96, as described below.

As shown and discussed above with respect to valve 42, each of the ball members 84, 84' is provided with a slot 98 which is adapted to receive a lowermost tab 100 of a stem 102. The stem is inserted into the valve housing 70' through a threaded opening 103 which is perpendicular to the openings 64, 66. The stem is provided with an annular bearing 106 and is sealed by a threaded packing nut 108 to maintain the stem in secure engagement with the slot of the ball member 84, 84'. The control levers 72', 82' are then mounted on the respective stem 102 by a nut 110. The control levers 72', 82' each have a depending tab which selectively limits movement of the control lever. In this way, movement of the ball members 84, 84' is likewise limited to movement between the "test" and "drain" or "open" and "close" positions, respectively.

FIGS. 9A–9C illustrate the relative positions of the first and second ball members 84, 84' within the valve 42' during unrestricted flow, during a test configuration with a restricted flow, and during a closed configuration.

Referring now to FIG. 9A, the valve 42' is configured to drain the system. The control lever 82' is disposed in a "drain" position such that an unrestricted flow is obtained through ports 58 and 62 of the first ball member 84. Similarly, the control lever 72' is disposed in an open position such that an unrestricted flow is obtained through ports 58' and 62' of the second ball member 84'. Thus, the flow through the valve 42' from the inlet opening 64 to the outlet opening 66 is unrestricted.

Referring to FIG. 9B, the valve 42' is configured to test the system. More specifically, the control lever 82' has been moved clockwise from the "drain" position to the "test" position with the first ball member 84 likewise being rotated 90 degrees within the valve housing 70'. As illustrated, when the control lever 82' is in the "test" position, fluid communication is provided through the port 60 and the restricted opening 56 in the first ball member 84. Similarly, when it is desired to test the system, the control lever 72' remains in an "open" position, thus allowing an unrestricted flow through the ports 58' and 62' of the second ball member 84' corresponding to the incoming flow from the restricted port 56 of the first ball member 84. Thus, when the control lever 82' is in the "test" position, and the control lever 72' is in an "open" position, the flow through the valve 42' from the inlet 44 to the outlet 48 in a preferred embodiment corresponds to the flow through a single fire sprinkler head 40 of the system to be tested.

Referring now to FIG. 9C, the valve 42' is configured in a closed position. The control lever 82' is in a "drain" position in which fluid communication between the inlet opening 64 and the outlet opening 66 is allowed at an unrestricted flow, but the control lever 72' is in the "close" position and the second ball member 84' is positioned such that fluid communication is prevented by a solid portion of the ball member 84' meeting the seat 86' provided within the valve housing, to thereby prevent flow through the outlet 66 (the remaining seats not being shown in FIG. 9C, or in FIGS. 9A and 9B).

The valve 42' is preferably provided with a boss 96 (shown in FIG. 7) for tapping for a solenoid or other device or to provide a pressure relief function for the fire suppression system by providing a pressure relief valve 92 (as shown for the embodiment of FIG. 1). As illustrated, the boss 96 is associated with the second ball member 84'. The outlet of the pressure relief valve 92 is preferably returned to the flow within the housing 70' through the tapping provided at boss 94. During normal installation of a fire suppression system, the system is usually initially tested at a higher pressure than that which can be withstood by a pressure relief valve. Thus, the bosses 96 and 94 should initially be provided with a plug (not shown) in order to test the initial installation. Thereafter, the system can be shut off so that removal of the plugs from the tappings 96, 94 is permitted. The advantage of placing a pressure relieve tapping on the second ball member 84' rather than the first ball member 84 is that it eliminates the need to first drain the entire system in order to install the pressure relief valve in tapping 96. By virtue of the pressure relief tapping being associated with the second ball member 84', and the solid portion of the ball member 84' seating against the seat 80 adjacent the opening 96 (see FIG. 9A) when in the open position, the tapping can be isolated such that the plug may be removed and the pressure relief valve 92 can then be installed without draining the overall system. Alternatively, the control lever 72' may be provided with a detent permitting an installer or technician to over-rotate the lever 72' beyond the desired "open" and "close" limits. In such instance, the solid portion of the second ball member 84' may be over-rotated, and thereby be seatingly disposed adjacent seat 88, so as to isolate the tapping 96 for installation of a pressure relief valve. The valve 42' can thus provide a test configuration as well as a pressure relief function for the fire suppression system in a relatively simple and inexpensive manner. If a solenoid or pressure relief function is not desired, a plug (not shown) may remain inserted in the tapping bosses 96 and 94 so as not to otherwise interfere with normal operation of the valve.

The control levers 72', 82' are oriented in opposite directions in valve 42', whereas the control levers 72, 82 are oriented in a similar direction in valve 42. It should be apparent to one skilled in the art that either arrangement of control levers could used equally as well with respect to either valve 42 or 42'.

With reference again to FIG. 1, according to a further aspect of the present invention, an outlet 48 of the valve 42 may be connected to a fitting 50 having at least one sight glass 52 threadably received at a coupling of the fitting. Preferably, two sight glasses 52 may be provided which are separated from each other by an angle of about 90 degrees. It is preferred that the sight glasses 52 on the housing 50 be offset 45 degrees to either side of a longitudinal line extending along the top of the fitting 50. Alternatively, at least one sight glass 52' may be integrally formed within the valve housing, as shown in FIG. 8 with respect to valve 42'. It is understood that the primary considerations in determining the orientation and position of the sight glass are the relationship between the housing and any obstructions, such as walls, that may interfere with a user's access to the sight glass, and the ease of visibility of a flow through the sight glass in any given orientation.

Since a primary indicator of fluid motion through the housing of the valve 42, 42' is air bubbles passing therethrough, it is preferred that at least one sight glass be provided near the top of the housing so that air is trapped within the housing adjacent the sight glass to facilitate viewing of the water and bubbles. However, other constructions are possible.

By employing the preferred sight glass arrangement, the visual observation of flow through the valve 42, 42' is enhanced. For example, a light may be directed into one of the sight glasses furthest from the person checking the flow condition so as to illuminate the inside of the sight glass housing thus permitting the person to easily see the flow condition therein, typically by the passage of air bubbles through the sight glass housing.

Figure 10A:
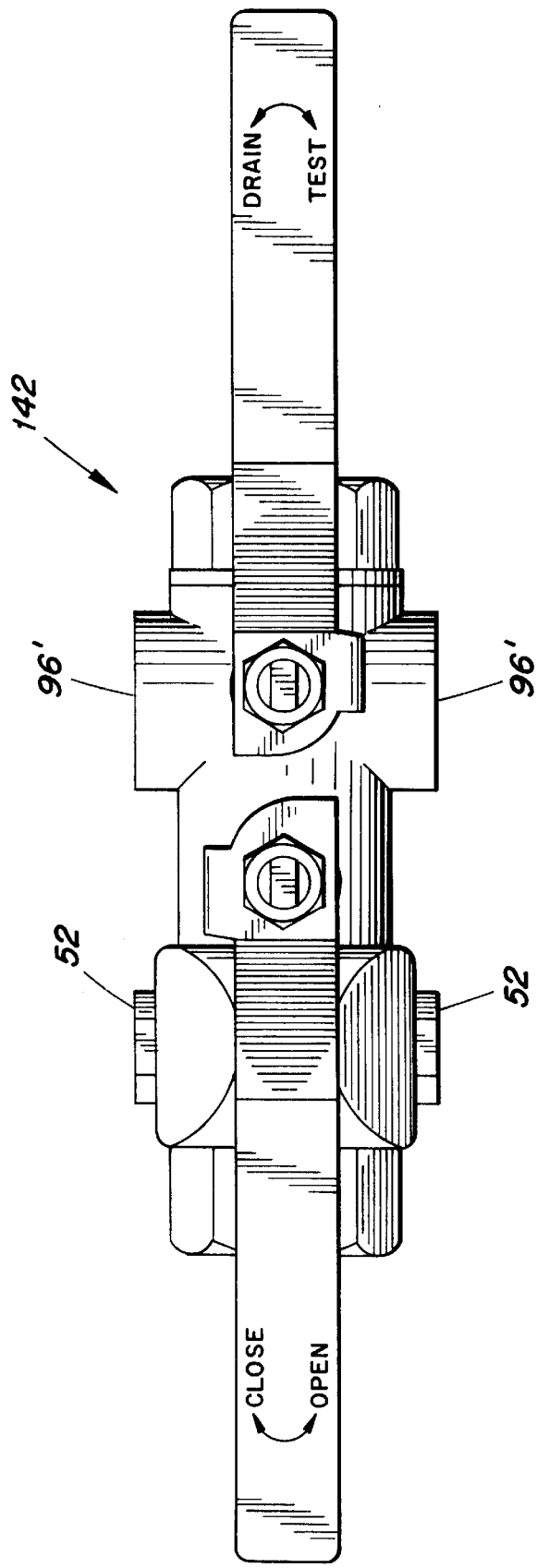
Figure 10C:
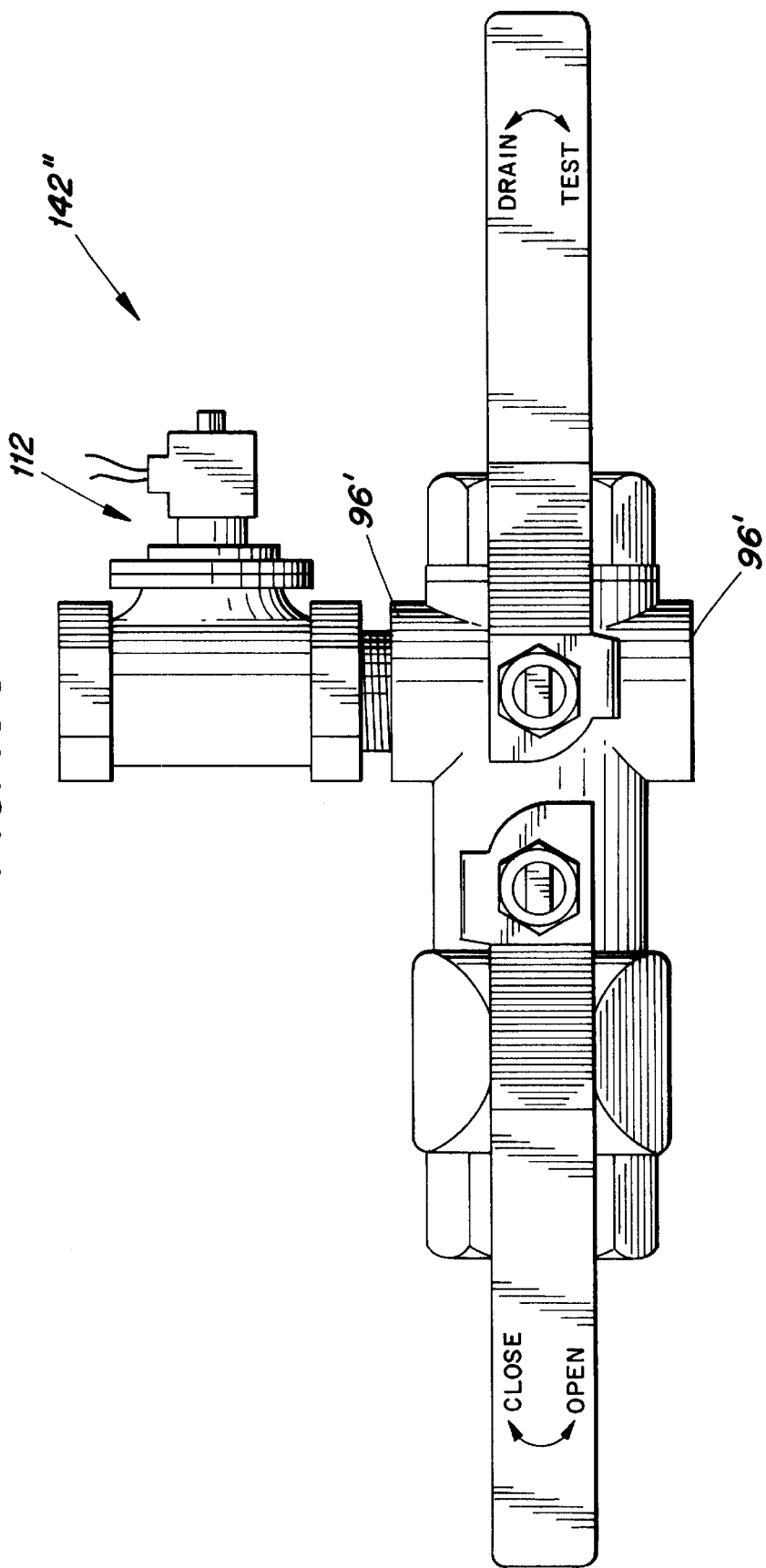

Referring to FIGS. 10A–10C, various alternatives of the present valve arrangement are illustrated. The valve arrangement 142 shown in FIG. 10A includes two sight glasses 52 disposed on the second ball member and two tappings 96' disposed on the first ball member. The number of sight glasses and tappings could of course be decreased, and the arrangement thereof could be reversed for one or for both, as will be appreciated by one skilled in the art. FIG. 10B illustrates a valve arrangement 142' including a pressure relief valve 92 and FIG. 10C illustrates a valve arrangement 142" including a solenoid valve 112. Although illustrated on different valve arrangements, the pressure relief valve and the solenoid valve could of course be installed on the same valve arrangement, as should be clear to one skilled in the art.

The in-line valve arrangement for fire suppression water sprinkler system has been shown and described above according to the preferred embodiments thereof. It should be obvious to one skilled in the art that various other modifications and alterations can be made without departing from the scope of the present invention.

What is claimed is:

1. A valve arrangement for use in a fire suppression sprinkler system, said valve arrangement comprising:
   a valve member for controlling the flow of a fluid, said valve member comprising a housing having an inlet and an outlet, said valve member comprising a first configuration selectively permitting an unrestricted flow from the inlet to the outlet, and a second configuration selectively permitting a restricted flow from the inlet to the outlet;

wherein said valve member includes at least a first ball member and a second ball member disposed within said housing.

2. The valve arrangement of claim 1, wherein said first ball member includes first, second, third and fourth ports arranged about a surface of said first ball member.

3. The valve arrangement of claim 2, wherein said second ball member includes at least a first and a second port arranged about a surface of said second ball member.

4. The valve arrangement of claim 3, wherein one of said ports on said first ball member comprises a restricted opening which is smaller than any of said other ports.

5. The valve arrangement of claim 4, wherein said first configuration defines an open position, said first ball member having two of said ports of similar dimension axially aligned with the inlet and the outlet and said second ball member having said first and second ports axially aligned with the inlet and the outlet.

6. The valve arrangement of claim 5, wherein said second configuration defines a test position, said first ball member having said restricted opening port and one of said other ports axially aligned with the inlet and the outlet and said second ball member having said first and second ports axially aligned with the inlet and the outlet.

7. The valve arrangement of claim 4, wherein said valve member further comprises a third configuration selectively blocking fluid flow from the inlet to the outlet.

8. The valve arrangement of claim 7, wherein said third configuration defines a closed position, said second ball member having said first and second ports axially arranged substantially perpendicular to the inlet and the outlet.

9. The valve arrangement of claim 1 further comprising a control mechanism for selectively moving said first and second ball members within said housing of said valve member.

10. The valve arrangement of claim 9 wherein said control mechanism includes first and second control members and whereby communication between said inlet and said outlet may sequentially be closed, opened to the unrestricted flow rate and opened to restricted flow rate, unrestricted flow rate being greater than said restricted flow rate.

11. The valve arrangement of claim 10, wherein said first control member is operable between a test position and a drain position, thereby rotating said first ball member from a restricted flow position to an unrestricted flow position.

12. The valve arrangement of claim 11, wherein said second control member is operable between an open position and a close position, thereby rotating said second ball member from having said first and second ports axially aligned with the inlet and the outlet to having said first and second ports substantially perpendicular with the inlet and the outlet.

13. The valve arrangement of claim 1 wherein each said ball member is generally spherical.

14. The valve arrangement of claim 1, wherein said housing further includes at least one threaded tapping.

15. The valve arrangement of claim 14, further comprising a pressure relief valve received within the at least one threaded tapping of said housing.

16. The valve arrangement of claim 15, wherein said at least one tapping of said housing is in fluid communication with said first ball member.

17. The valve arrangement of claim 15, wherein said at least one tapping of said housing is in fluid communication with said second ball member, and said second ball member further comprises a third port, the third port being substantially perpendicular to the first and second ports.

18. The valve arrangement of claim 14, further comprising a sight glass received within the at least one threaded tapping of said housing.

19. The valve arrangement of claim 18, wherein said at least one threaded tapping of said housing is in fluid communication with at least one of said first ball member and said second ball member.

20. The valve arrangement of claim 14, further comprising a solenoid valve received within the at least one threaded tapping of said housing.

21. A valve for controlling the flow of a fluid for use in a fire suppression sprinkler system, said valve comprising:

a housing having an inlet and an outlet, said valve further comprising a first configuration selectively permitting an unrestricted flow from the inlet to the outlet, and a second configuration selectively permitting a restricted flow from the inlet to the outlet;

wherein said valve includes at least a first valve member and a second valve member disposed within said housing.

22. The valve of claim 21, wherein said first valve member includes first, second, third and fourth ports arranged about a surface of said first valve member.

23. The valve of claim 22, wherein said second valve member includes at least a first and a second port arranged about a surface of said second valve member.

24. The valve of claim 23, wherein one of said ports on said first valve member comprises a restricted opening which is smaller than any of said other ports.

25. The valve of claim 24, wherein said first configuration defines an open position, said first valve member having two of said ports of similar dimension axially aligned with the inlet and the outlet and said second valve member having said first and second ports axially aligned with the inlet and the outlet.

26. The valve of claim 25, wherein said second configuration defines a test position, said first valve member having said restricted opening port and one of said other ports axially aligned with the inlet and the outlet and said second valve member having said first and second ports axially aligned with the inlet and the outlet.

27. The valve of claim 24, wherein said valve member further comprises a third configuration selectively blocking fluid flow from the inlet to the outlet.

28. The valve of claim 27, wherein said third configuration defines a closed position, said second valve member having said first and second ports axially arranged substantially perpendicular to the inlet and the outlet.

29. The valve of claim 21 further comprising a control mechanism for selectively moving said first and second valve members within said housing of said valve.

30. The valve of claim 29 wherein said control mechanism includes first and second control members and whereby communication between said inlet and said outlet may sequentially be closed, opened to the unrestricted flow rate and opened to restricted flow rate, unrestricted flow rate being greater than said restricted flow rate.

31. The valve of claim 30, wherein said first control member is operable between a test position and a drain position, thereby rotating said first valve member from a restricted flow position to an unrestricted flow position.

32. The valve of claim 31, wherein said second control member is operable between an open position and a close position, thereby rotating said second valve member from having said first and second ports axially aligned with the inlet and the outlet to having said first and second ports substantially perpendicular with the inlet and the outlet.

33. The valve of claim 21, wherein said housing further includes at least one threaded tapping.

34. The valve of claim 33, further comprising a pressure relief valve received within the at least one threaded tapping of said housing.

35. The valve of claim 34, wherein said at least one tapping of said housing is in fluid communication with said first valve member.

36. The valve of claim 34, wherein said at least one tapping of said housing is in fluid communication with said second valve member, and said second valve member further comprises a third port, the third port being substantially perpendicular to the first and second ports.

37. The valve of claim 33, further comprising a sight glass received within the at least one threaded tapping of said housing.

38. The valve of claim 37, wherein said at least one threaded tapping of said housing is in fluid communication with at least one of said first valve member and said second valve member.

39. The valve of claim 33, further comprising a solenoid valve received within the at least one threaded tapping of said housing.

\* \* \* \* \*